United States Patent
Ruff

(10) Patent No.: US 8,913,634 B2
(45) Date of Patent: Dec. 16, 2014

(54) METHOD AND APPARATUS FACILITATING MULTI MODE INTERFACES

(75) Inventor: Alan Ruff, Poplar Grove, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 2587 days.

(21) Appl. No.: 11/096,607

(22) Filed: Apr. 1, 2005

(65) Prior Publication Data
US 2006/0222021 A1   Oct. 5, 2006

(51) Int. Cl.
*H04J 3/12*   (2006.01)
*H04B 1/38*   (2006.01)
*H04M 1/60*   (2006.01)

(52) U.S. Cl.
CPC ............. *H04J 3/12* (2013.01); *H04B 1/3822* (2013.01); *H04M 1/6083* (2013.01)
USPC ............. 370/522; 370/464; 370/498; 455/73; 455/74

(58) Field of Classification Search
CPC ........... H04J 3/00; H04B 1/38; H04B 1/3805; H04B 1/3822; H04B 1/401; H04M 1/6033; H04M 1/6041; H04M 1/6075; H04M 1/6083; H04M 1/6091
USPC ............................. 370/522; 455/73, 74, 355
See application file for complete search history.

(56) References Cited

U.S. PATENT DOCUMENTS

| | | | | |
|---|---|---|---|---|
| 3,968,333 A | * | 7/1976 | Simokat et al. | 379/413 |
| 4,429,997 A | * | 2/1984 | Matthews | 356/467 |
| 4,979,094 A | * | 12/1990 | Gemmell et al. | 700/83 |
| 5,091,725 A | * | 2/1992 | Gard | 340/854.1 |
| 5,384,539 A | * | 1/1995 | Morbe et al. | 324/527 |
| 5,430,408 A | * | 7/1995 | Ovens et al. | 327/404 |
| 5,684,679 A | * | 11/1997 | Hong | 363/21.01 |
| 5,818,949 A | * | 10/1998 | Deremer et al. | 381/172 |
| 5,867,794 A | * | 2/1999 | Hayes et al. | 455/557 |
| 5,961,333 A | * | 10/1999 | Harrison et al. | 434/322 |
| 6,057,555 A | * | 5/2000 | Reedy et al. | 257/9 |
| 6,603,986 B1 | * | 8/2003 | Bozoukov | 455/569.2 |
| 6,806,742 B1 | * | 10/2004 | Briones et al. | 327/10 |
| 6,813,350 B2 | * | 11/2004 | Ching | 379/386 |
| 7,103,381 B1 | * | 9/2006 | Wright et al. | 455/557 |

(Continued)

FOREIGN PATENT DOCUMENTS

EP   1049347 A1 * 11/2000

OTHER PUBLICATIONS

Terry Remple, Meagan Hayes and Dave Wilson, Draft DEA-936-A Mini-USB Analog Carkit Interface, Feb. 7, 2005.

(Continued)

*Primary Examiner* — Ayaz Sheikh
*Assistant Examiner* — Tarell Hampton

(57) ABSTRACT

A system comprises a pulse generator 615 configured to provide a control pulse a transmission gate 603 configured to interrupt a path between a communication device 307 and an auxiliary device 303 during the control pulse; and a pulse transmitter 607 responsive to the control pulse and configured to inject an interrupt pulse in the path while the path is interrupted. A corresponding method of providing an interrupt signal in an audio path between a source and a sink includes interrupting an audio path between the source and the sink, injecting an interrupt pulse in the audio path while the audio path is interrupted, and then reconnecting the audio path.

7 Claims, 4 Drawing Sheets

(56) References Cited

U.S. PATENT DOCUMENTS

| | | | |
|---|---|---|---|
| 2001/0034246 A1* | 10/2001 | Hutchison et al. | 455/557 |
| 2002/0137505 A1* | 9/2002 | Eiche et al. | 455/425 |
| 2002/0184566 A1* | 12/2002 | Catherwood | 714/38 |
| 2003/0045265 A1* | 3/2003 | Huang et al. | 455/355 |
| 2003/0065964 A1* | 4/2003 | Parikh | 713/500 |
| 2003/0174779 A1 | 9/2003 | Sugaya et al. | |
| 2003/0227980 A1* | 12/2003 | Batra et al. | 375/295 |
| 2004/0161064 A1 | 8/2004 | Brethour et al. | |
| 2005/0018785 A1 | 1/2005 | Oshima | |
| 2005/0068436 A1 | 3/2005 | Fraenkel et al. | |
| 2005/0189969 A1* | 9/2005 | Nicholas | 327/131 |
| 2005/0267672 A1* | 12/2005 | Holcomb et al. | 701/123 |
| 2005/0268000 A1* | 12/2005 | Carlson | 710/15 |
| 2010/0062759 A1* | 3/2010 | Sinton et al. | 455/426.1 |

OTHER PUBLICATIONS

International Search Report and Written Opinion for correlating PCT Patent Application No. PCT/US06/10579 dated Jun. 4, 2008.

* cited by examiner

METHOD AND APPARATUS FACILITATING MULTI MODE INTERFACES

FIELD OF THE INVENTION

This invention relates in general to communication interfaces, and more specifically to a method and apparatus for facilitating multi mode interfaces.

BACKGROUND OF THE INVENTION

Portable devices, such as communications devices, e.g. cellular phones, etc., have become commonplace if not ubiquitous. Along with the increasing popularity of these various devices, the functionality of the devices has also increased. The need to communicate or interface between these devices and other devices, e.g., auxiliary devices of various forms, given the increase in popularity and functionality has also exploded.

Furthermore, concerns about operator distraction and the like related to the use of devices, such as cellular phones and the like while operating automobiles has increased the demand for handsfree operation of the cellular phone while in an automobile. In these and other situations the phone, etc. is carried on the person until the person enters the automobile at which time some technique for readily interfacing the phone to an auxiliary device, such as handsfree functionality or the like is needed.

While various cellular phone providers have utilized proprietary interfaces there has been increasing interest in a standardized interface. Organizations such as the Consumer Electronics Association have proposed one or more standard interfaces. The standard interfaces represent in many cases additional costs in economic and possibly complexity and size terms, all of which are important parameters in the portable device marketplace. Thus it is important to have elegant implementations of these interfaces and this tends to drive interfaces where various paths may support multiple modes in the interface. Methods and apparatus to facilitate the various modes and changes between modes can be overly complex and thus economically burdensome.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication interfaces between devices and methods and apparatus for facilitating such interfaces. More particularly various inventive concepts and principles embodied in methods and apparatus for providing an interrupt signal to facilitate multi-mode interfaces will be disclosed.

The devices of particular interest may vary widely, however much of this disclosure will focus on interfaces and facilitating interfaces between communication devices, such as cellular phones and the like and auxiliary devices, such as a car kit to support, for example, handsfree operation, stereo audio playing, and data exchanges. Interfaces of particular interest include CEA-936 defined by the Consumer Electronics Association or similar interfaces supporting multi mode operation, e.g., audio, data, or audio with multiplexed data, etc., with interrupt signals used for signaling, such as changes in modes of operation and the like.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including for example application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
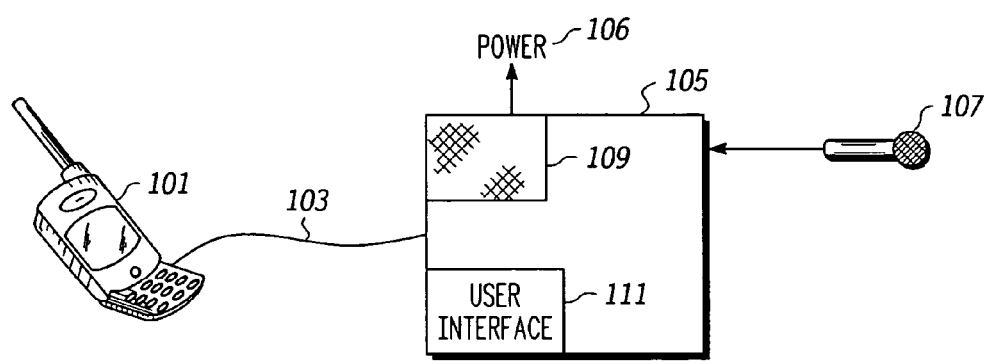
FIG. 1 and FIG. 2 depicts, in a simplified and representative form, a system level diagram of a device with an interface to an auxiliary device.

Referring to FIG. 1, a simplified and representative system diagram showing a device 101, e.g., cellular phone or other communication device, with an interface 103 to an auxiliary device 105 will be briefly discussed and described. The device 101, e.g., cellular phone or other communication device is known other than the modifications and the like discussed and described herein. The auxiliary device 105, as depicted in FIG. 1, includes known handsfree functionality and includes means for accessing a power source 106, e.g., an auxiliary power plug (cigarette lighter plug) as may be found, for example, in an automobile, boat, RV, or the like, or a conventional household AC power outlet. Note that normally power will be supplied from the auxiliary device 105 to the device 101 for operation of the device and charging any battery that is ordinarily used (at least if the device 101 is battery powered). Further included is an optional microphone 107, a speaker 109 and possibly some user interface functionality 111, e.g., one or more status indicators and control buttons. In a handsfree mode of operation microphone audio from the microphone is provided to the device 101 (cellular phone) and audio to drive the speaker is provided from the cellular phone with switching performed in accordance with known techniques. The interface will be further described below, however physically one or more embodiments utilize a 4 wire Universal Serial Bus (USB) interface including mini A and B plugs.

Figure 2:
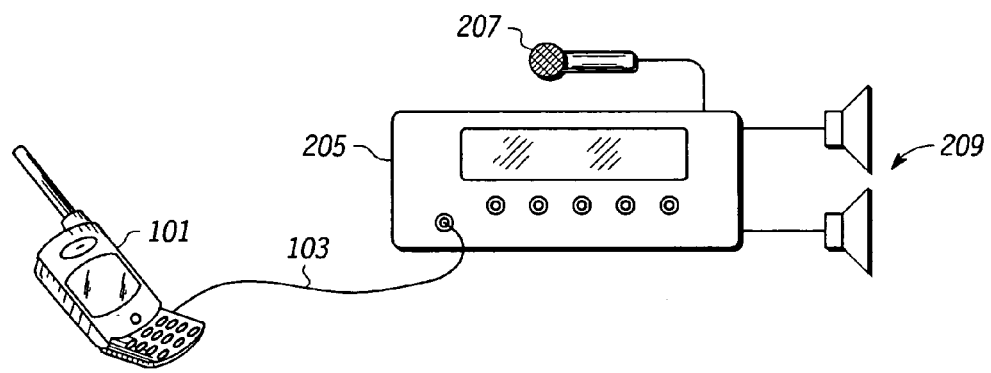

Referring to FIG. 2, another simplified and representative system diagram showing the device 101 with the interface 103 to another auxiliary device, e.g. an automotive stereo system or other stereo system 205, will be briefly discussed and described. The stereo system includes integrated interface support (interface further described below) and may further include an optional microphone 207 and stereo (right and left) speakers 209. This system may be used to support handsfree operation of the device 101, e.g., cellular phone, or may be used to play stereo music or audio through the stereo system 205 where the music is provided by the device or cellular phone, via for example MP3 player functionality or the like. Note that the auxiliary device may be integrated with various other functions or apparatus including, for example, a navigation or computing unit or the automobile or the like.

Figure 3:
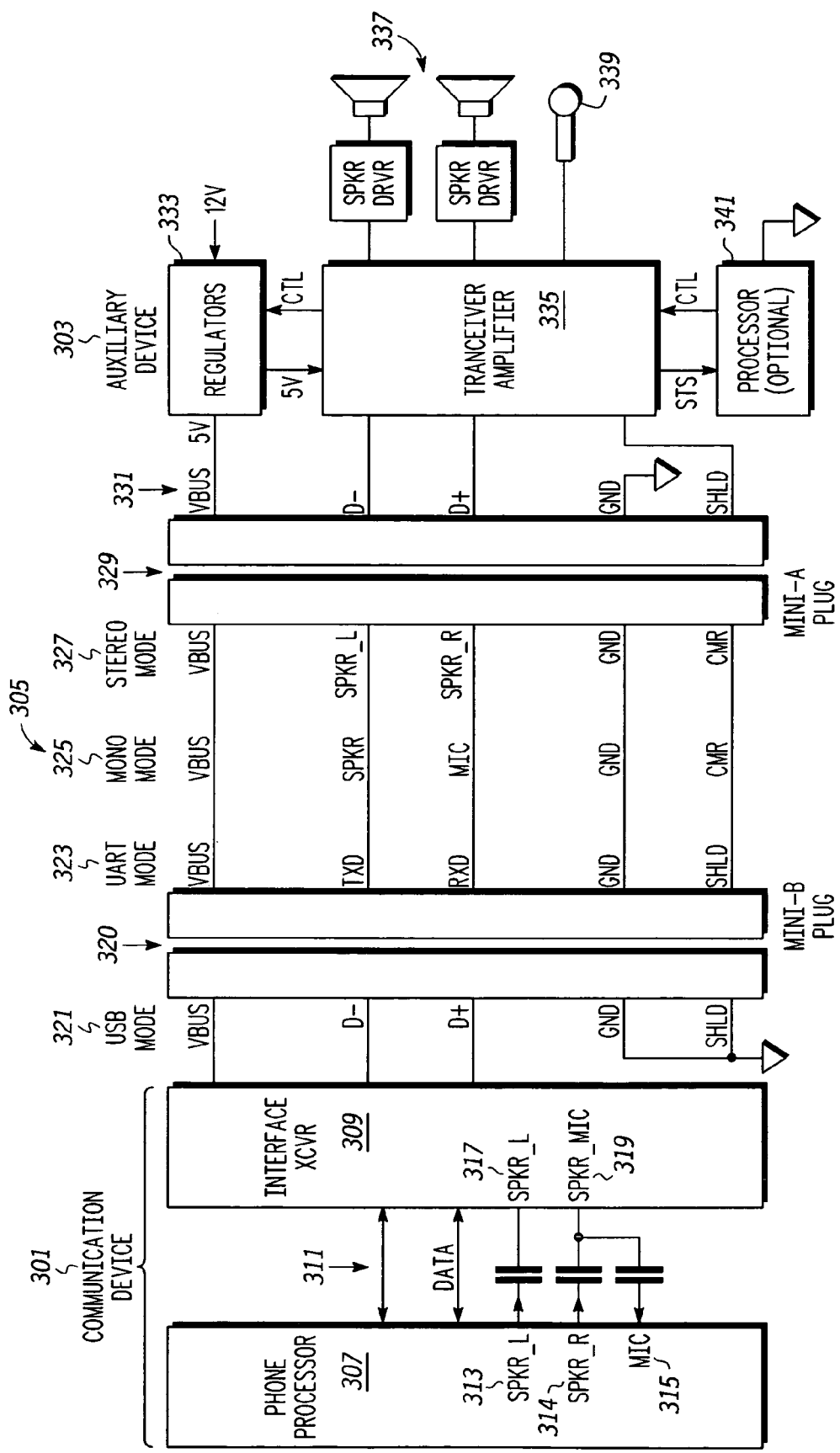
FIG. 3 depicts, a more detailed diagram of an embodiment of an interface between a communication device and an auxiliary device where the interface supports varying modes of operation.

Referring to FIG. 3, a more detailed diagram of an embodiment of an interface between a device or communication device 301 and an auxiliary device 303 where the interface 305 supports varying modes of operation will be discussed and described. While the concepts and principles discussed below can have broad application to various interfaces, this interface diagram is in accordance with the CEA-936 interface and will not be described in detail herein other than as relevant to one or more embodiments in accordance with the present invention. Generally a conventional communication device includes a processor 307 (it is understood that this may include various other known functionality of communication devices) and in one or more embodiments further includes an interface transceiver 309. The processor and interface transceiver are arranged and constructed to exchange data via data bus 311. The processor 307 when suitably equipped can provide speaker audio output at SPKR_L 313 in mono mode or SPKR_L (left audio channel) 313 and SPKR_R (right audio channel) 314 if in stereo mode, where the mono mode may correspond to a conventional phone call and the stereo mode may correspond to playing stereo music via an MP3 player, stereo radio, or the like (incorporated with the communication device). Microphone audio 315 is an input to the processor 307. These audio inputs and outputs are coupled to the interface transceiver 309 as shown.

The interface transceiver 309 supports the interface 305 including various modes of operation. These modes of operation are supported via a physical interface comprising at the interface transceiver a 4 wire USB mini-B receptacle and plug 320 with a VBUS, D−, D+, and GND line as shown. The modes include a USB mode 321, a Universal Asynchronous Receiver & Transceiver (UART) mode 323, a mono mode 325, and a stereo mode 327. A physical interface at the auxiliary device 303 may include a mini-A receptacle and plug 329 or may be hardwired. VBUS normally provides power (e.g., 5 volts) to the Communication device 301, e.g., for operation and battery charging purposes, and the ground is a return path for the power supply currents. The D− and D+ lines are used for varying purposes depending on the mode of operation. In the USB mode the lines, including VBUS, are used in accordance with known USB protocols. In the UART mode D− is used to send data to the auxiliary device and the D+ line is used to receive data. In mono mode 325, D− carries audio (SPKR) to the auxiliary device and D+ carries microphone audio (MIC) from the auxiliary device. In stereo mode 327, D− carries SPKR_L and D+ carries SPKR_R to the auxiliary device. The interface transceiver imposes or inserts an interrupt signal or pulse on SPKR_L when the communication device wants to change the operating mode, e.g., inform the auxiliary device that data is going to be sent and an interrupt pulse is inserted on SPKR_R by the auxiliary device to inform the interface transceiver that data will be sent.

The auxiliary device 303 can take many forms where the exemplary one shown includes power (VBUS 331) supplied in a known manner from Regulators 333 that are coupled to a power source such as a 12V automotive battery or other power source as may be appropriate. These regulators also supply power to other functions in the auxiliary device, such as the transceiver amplifier 335 and optional processor 341. The transceiver amplifier supports the interface 305 in one or more modes of operation and is shown driving speakers 337 and receiving microphone audio from a microphone 339 (e.g., in accordance with a speaker phone or handsfree function or to play a stereo signal).

Figure 4:
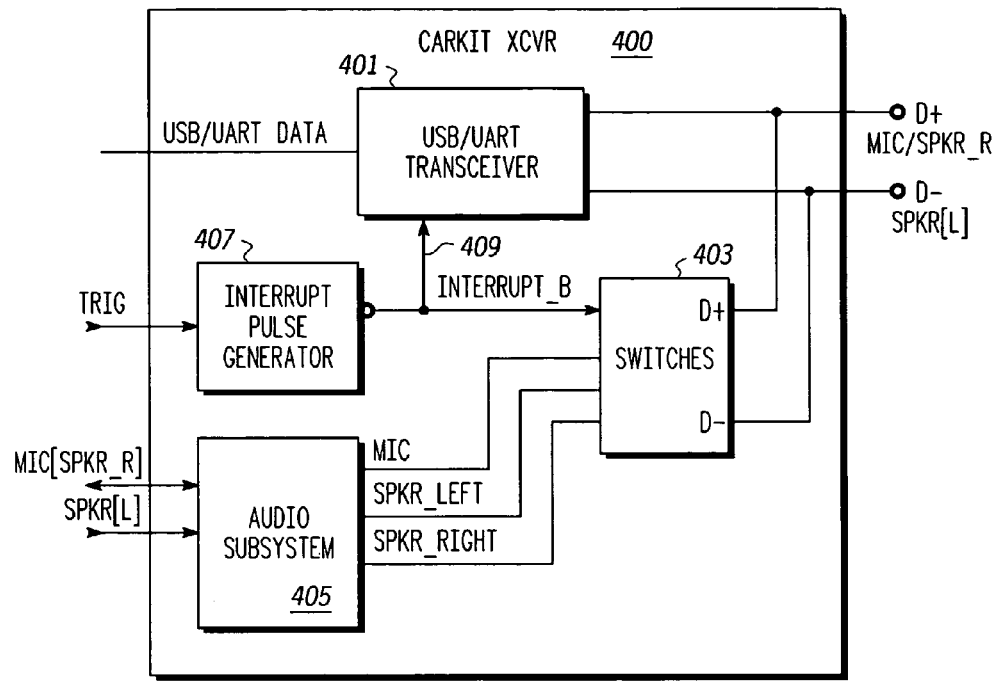
FIG. 4 depicts a block diagram of a portion of one embodiment of an interface transceiver similar to that of FIG. 3.

Referring to FIG. 4, a block diagram of a portion of one embodiment of an interface transceiver similar to interface transceiver 309 will be discussed and described. The interface transceiver 400 or portion thereof includes a USB/UART transceiver 401 that is coupled to USB or UART data lines or bus, from, for example, a cellular phone or the like, as well as D+ (MIC or SPKR_R depending on mode) and D− (SPKR or SPKR_L depending on mode) at an interface, such as, the interface 305. Further included is a switching function 403 that includes various switches or transmission gates that are used to route, for example audio appropriately, as well as isolate or interrupt various paths as needed. The switching function 403 is also coupled to D− and D+ at the interface. An audio subsystem 405 is coupled via a microphone and SPKR ports to the switching function 403 as well as via microphone or speaker right and speaker or speaker left ports to, the cellular phone, etc. Further included is a pulse or interrupt pulse generator 407 that provides an interrupt or control pulse or signal at 409. This pulse can be used to control the UART transceiver 401 and the switching function 403 so as to insert, impose, or inject an interrupt pulse in a path (audio path) and concurrently interrupt or disconnect the path for the duration of the pulse, i.e. the path can be reconnected after the pulse. For example a low impedance portion of the path, from, for example, a source or audio driver, can be isolated from a second portion while the interrupt pulse is injected using a conventional UART transmitter on the second portion, e.g., the D− line. This advantageously allows "reuse" of a UART transmitter and avoids providing a transmitter with sufficient output capability to overwhelm a low impedance source, such as a typical audio driver. Note that this and other functionality is suitable for implementation in integrated circuit form.

With the arrangement in FIG. 4, a method of providing an interrupt signal in a path that is multiplexed between a plurality of modes can be implemented. For example an interrupt signal can be provided in an audio path between a source (audio driver) and a sink (speaker or audio amplifier), where the method includes interrupting the audio path between the source and the sink using the switches or switching function 403 and then injecting an interrupt pulse in the audio path using the UART transceiver 401. In one or more embodiments the interrupt pulse is inserted while the audio path is interrupted and then reconnecting the audio path via the switching function occurs. The interrupting and inserting timing, etc. is controlled by the pulse generator 407.

Figure 5:
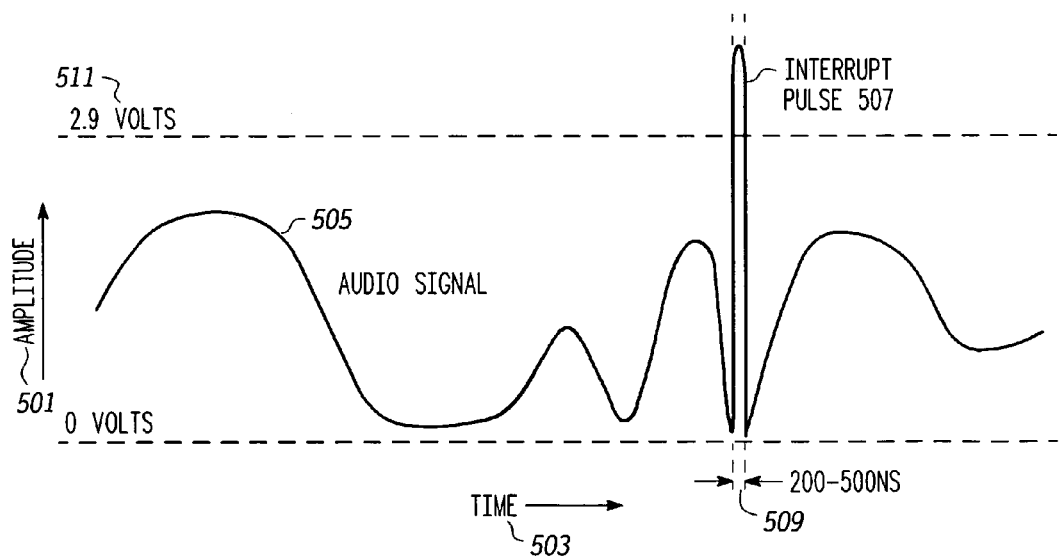
FIG. 5 is a diagram showing an interrupt pulse injected into an audio signal.

Referring to FIG. 5, a diagram showing an interrupt pulse injected into an audio signal will be described and discussed. FIG. 5 shows a diagram with amplitude 501 on the vertical axis as a function of time 503 on the horizontal axis. A signal 505, such as an audio signal, is depicted with an interrupt pulse 507 inserted in the signal 505. Note that the interrupt pulse normally has one or more specifications that may be interface dependent. In this instance the interrupt pulse 507 has a predetermined time or time window 509 that must be greater than 200 nanoseconds (ns) and less than 500 ns as well as a predetermined or specified amplitude that should be greater than 2.9 volts 511. This interrupt pulse is in accordance, for example, with CEA-936 recommendations.

Figure 6:
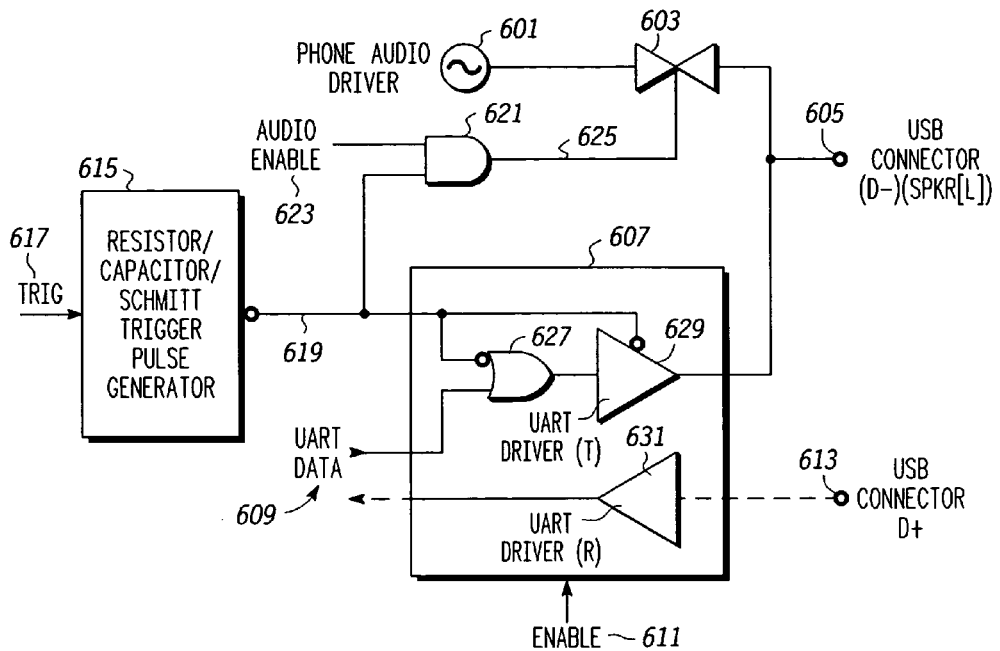
FIG. 6 illustrates a more detailed diagram of a system suitable to provide the interrupt pulse in a path according to FIG. 5 in one or more embodiments.

Referring to FIG. 6, a more detailed diagram of a system or apparatus suitable for implementation in one or more integrated circuits to provide the interrupt pulse in an audio or other signal path according to FIG. 4 in one or more embodiments will be discussed and described. Note that the system of FIG. 6 can be implemented as a portion of the UART transceiver 401, switching function 403 and pulse generator 407 of FIG. 4. FIG. 6 depicts an audio driver 601 in exemplary form. This driver in various embodiments is a source, e.g. low impedance source, and would typically be part of the communications device 301 or cellular phone. The driver 601 is coupled to a transmission gate 603 or other (normally) electronic switch that is coupled in turn to a USB connector (D− or SPKR or SPKR_L depending on operating mode) 605. When the transmission gate 603 is enabled, audio or other signals from the source or driver is routed or coupled to a consuming or sink node, e.g., via the interface 305 to the auxiliary device 303. When the transmission gate is open or disabled the driver 601 and corresponding portion of the path are isolated from the remainder of the path, i.e. from the transmission gate to the auxiliary device.

Further included in the system is a pulse transmitter 607, part of a UART transceiver in one or more embodiments. This transceiver 607 normally, when enabled in a data mode via an enable signal at 611 as is known and as provided, for example, by the device 307 or communication device, transmits or sends data at 609 from the device or communication device to the USB connector 605 and thus, for example, the auxiliary device. Similarly the transceiver, when enabled, receives data from USB connector 613, thus the auxiliary device, and sends the data to 609 and thus the device or cellular phone.

Further included in the system of FIG. 6 is a pulse generator 615 that is configured such that when triggered by a trig signal 617 from, for example a cellular phone or the like, generates or provides an output pulse or control pulse at 619. In one or more embodiments this control pulse is a negative pulse and lasts for a time period or predetermined duration, such as 200-500 ns as in FIG. 5. This control pulse is coupled to an AND gate 621 and AND'd with an audio enable signal 623 available from the device or cellular phone, to provide an output signal at 625. It will be appreciated that the signal at 625 is high if the audio enable signal 623 is high unless the control pulse exists. If the signal at 625 is high the transmission gate is ON or enabled. Thus when the audio mode is enabled and a control pulse is provided, the transmission gate is configured to interrupt a path (e.g., audio path) between a source or communication device, e.g., cellular phone and a sink or interface, e.g., CarKit interface or the like, and thus auxiliary device (Car Kit or the like) responsive to and during the control pulse.

Additionally, the control pulse at 619 is coupled to the UART or pulse transmitter 607 which is responsive to the control pulse and configured to inject or insert an interrupt pulse in the path, signal path, or audio path while the path is interrupted. More specifically the pulse is coupled at an inverting input of an OR gate 727 as well as at an inverting enable input of UART driver or transmitter 629. Note that the "normal" enable 611 can be OR'd with the control pulse (inverted) with the result used to enable the UART driver or transmitter 629. This arrangement, while not depicted, would be similar to the arrangement at OR gate 627. Data or UART data is coupled to the other input of the OR gate and thus the output of the OR gate is equal to the UART data until the control pulse is present in which case it is high while or during the control pulse. Thus when the control pulse is present the UART driver (transmitter) transmits or sends, e.g. injects or inserts an interrupt pulse in the path (audio or other signal path). Note this is concurrent with the transmission gate being open and audio driver or the like thus being isolated from the balance of the path.

In summary, FIG. 6 shows a system that includes a pulse generator 615 configured to provide a control pulse at 619, a switch, e.g., a transmission gate 603, configured to interrupt a path between a communication device and an auxiliary device via an interface including D− at 605 during the control pulse and a pulse transmitter 607 that is responsive to the control pulse and configured to inject an interrupt pulse in the path while the path is interrupted. In one or more embodiments the switch or transmission gate 603 couples an audio driver 601 to the path when the path between the communication device and the auxiliary device is in an audio mode (audio enable 623 high and the control pulse is not present. Thus the transmission gate isolates the audio driver from the path when the control pulse is present.

The pulse transmitter 607 in various embodiments further comprises a universal asynchronous receiver and transmitter 629 (UART) that is enabled and driven by the control pulse to inject an interrupt pulse corresponding to the control pulse in the path when the path is in an audio mode. The UART further supports data communications between, for example, the communication device and the auxiliary device when the path is in a data mode (e.g., audio enable 623 low and enable 611 high). As noted earlier the interrupt pulse is used or injected into the path to signal to the auxiliary device that the path will be switched to a data mode. The pulse generator 615 and the pulse transmitter 607 are further configured in one or more embodiments to inject a pulse in the path in accordance with a Consumer Electronics Association cellular phone CarKit interface Standard, e.g., CEA-936 standard.

Note that the system of FIG. 6 is suitable for and may be advantageously implemented in integrated circuit form with very few modifications over base requirements for a CarKit interface, since the transmission gate and UART are normally required for the basic interface, at least if any form of data is to be exchanged. As will be further described below with reference to FIG. 7 the control pulse and thus interrupt pulse is arranged to have a predetermined or specified timing characteristic or duration that is dependent on a resistor capacitor circuit and in one or more embodiments this duration or timing characteristic is in accordance with, for example, the CEA-936 standards (see FIG. 5). The pulse transmitter insures that the interrupt pulse has a minimum or predetermined, i.e., specified, amplitude (largely dependent on supply voltage to the UART).

It will also be appreciated that the system or other similarly configured systems or circuits can implement various methods of providing interrupt signals in, for example, an audio or other signal path between a source and a sink or destination node. At a basic level the method includes interrupting the audio path between the source and the sink, injecting an interrupt pulse in the audio path while the audio path is interrupted, and then reconnecting the audio path. In some embodiments these methods include generating a control signal wherein the interrupting the audio path and the injecting the interrupt pulse are responsive to the control signal. The generating the control signal may comprise producing a pulse with timing controlled by a resistor capacitor ratio and latching the pulse with a Schmidt trigger to generate the control signal. The injecting the interrupt pulse may advantageously use a UART. In this manner, interrupting the audio path provides for or includes isolating a low impedance portion of the audio path and then injecting the interrupt pulse then injecting the interrupt pulse in a second portion of the audio path. This can advantageously be utilized for interrupting a path in an audio/UART interface (cell phone to CarKit interface—CEA-936) during an audio mode, thereby allowing for multiplexed control or payload signaling concurrently with audio exchanges.

Figure 7:
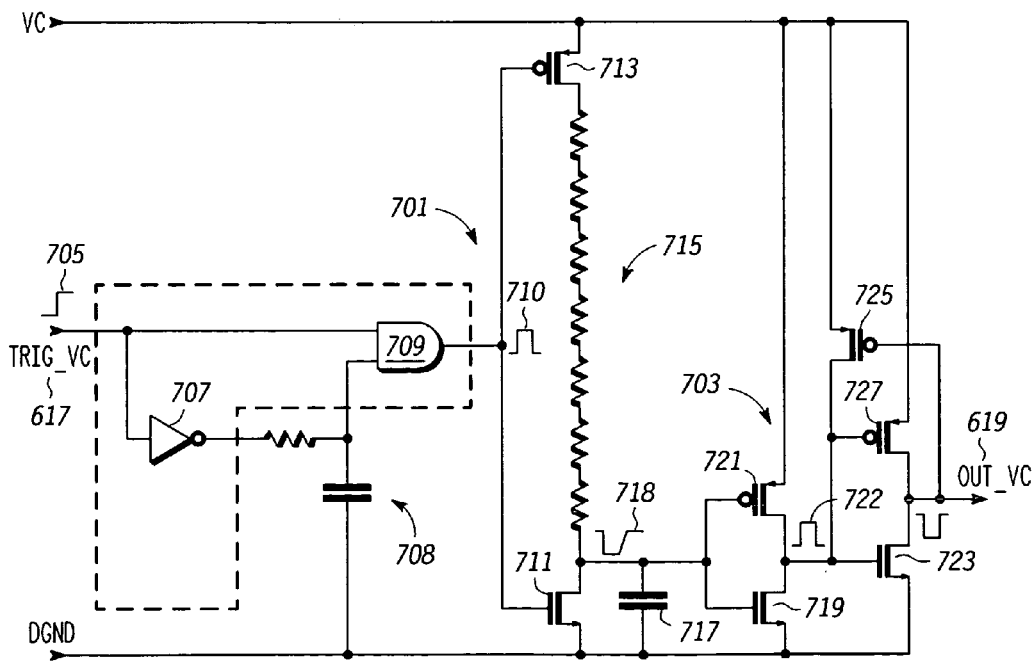
FIG. 7 illustrates a schematic level diagram for a pulse generator suitable for use in various exemplary embodiments.

Referring to FIG. 7, a diagram of one embodiment of a pulse generator 615 will be discussed and described. FIG. 7 as an overview shows a pulse circuit 701 configured to provide a pulse waveform with a duration dependent on a resistor capacitor circuit and a Schmidt trigger based detector 703 that provides, responsive to the pulse waveform, the control pulse. Thus a resistor capacitor pulse circuit is coupled to a Schmidt trigger detector and both are collectively configured to provide the control pulse with a predetermined timing characteristic.

More specifically FIG. 7 shows a trig voltage 617 that includes a rising edge 705. This is coupled to an inverter 707 and an AND gate 709. The inverter 707 is coupled via a resistor to the other input of the AND gate 709 which is also a node with a capacitor to ground. The resistor capacitor pair 708 insures that the AND gate outputs a positive pulse 710 for a time dependent on the resistor capacitor pair, nominally 12 nano seconds (ns) in one embodiment. The positive pulse 710 turns off a p-channel Field Effect Transistor (FET) 713 and turns on an n-channel FET 711. This stops current flow through the resistor string 715 and results in a capacitor 717 being discharged, yielding a curve similar to the waveform 718 (not drawn to scale—i.e., the rising edge looks like a resistor capacitor charging curve that when drawn to scale all but makes the zero portion of the curve disappear). In one or more embodiments the resistor string 715 has a value of 150 K ohms (the FET adds another 66 K ohms) and the capacitor 717 is 1.62 pico-farads, yielding an RC time constant of 350 ns (midway between the 200-500 ns specification noted in FIG. 5). The resistor string is shown as a plurality of resistors (seven), since the pulse generator is intended to be implemented as an integrated circuit and it may be more space efficient to lay out the resistors as many rather than only one or two structures. It is also noted that the p-channel FET 713 is not a low resistance high gain device. Its characteristics versus process and temperature variables tend to help compensate for corresponding variations in the resistor string and capacitor.

The waveform 718 is coupled to and turns off an n-channel FET 719 and turns on a p-channel FET 721 (while the waveform is below a threshold for the n-channel FET 721), thus generating a positive pulse 722. The positive pulse 722 turns another n-channel FET 723 on thereby pulling the output 619 low and starting the control pulse. This is reinforced by turning on a p-channel FET 725 which tends to turn off another p-channel FET 727 and turn on the n-channel FET 723. When the waveform 718 goes high, the pulse 722 will go low turning n-channel FET 723 off, p-channel FET 727 on, and p-channel FET 725 off, thus completing the Schmidt trigger operation and causing the output at 619 to go high thereby ending the control pulse or signal. Hence the output pulse is a negative pulse with a time duration or timing characteristic dependent on the RC circuit including resistor string 715 and capacitor 717. Using this pulse generator 615 and the pulse transmitter 607 as described and configured enables the system of FIG. 6 to inject a pulse in the path with at least one of a predetermined or specified duration and a predetermined or specified amplitude.

The processes, apparatus, and systems, discussed above, and the inventive principles thereof are intended to and can alleviate problems caused by prior art interfaces. Using these principles of interrupting a signal path or audio path, injecting an interrupt pulse while the path is interrupted, and then re-connecting the path will facilitate multiplexed interfaces or multi-mode interfaces without undue costs and the like associated with additional relatively high power and low impedance drivers or transmitters that are suitable for overwhelming low impedance sources, such as audio drivers. This will facilitate and encourage interfaces from one device to another auxiliary device in for example an automotive or other environment. While various embodiments in an interface transceiver that is typically part of a communication device have been discussed it is expected that similar embodiments in accordance with the invention can be utilized as part of the auxiliary device. Note that as discussed, the auxiliary device or interface transceiver portion thereof may be integrated as part of, for example, an automotive stereo unit (see FIG. 2) or as will be evident integrated as part of various other functions including, for example, an automobile or the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of providing an interrupt signal in an audio path between a source and a sink, the method comprising:
   interrupting the audio path between the source and the sink using a switch to disconnect the audio path between the source and the sink;
   injecting an interrupt pulse in the audio path while the audio path is interrupted, the interrupt pulse injected between the switch and the sink; and
   reconnecting the audio path after the interrupt pulse has ended using the switch, wherein the interrupting the audio path further comprises interrupting a path in an audio and UART interface during an audio mode.

2. A system comprising:
   a pulse generator configured to provide a control signal;
   a switch configured to interrupt a path between a communication device and an auxiliary device during the control signal; and a pulse transmitter responsive to the control signal and configured to inject an interrupt pulse in the path while the path is interrupted, wherein the switch is further configured to reconnect the path after the control signal, wherein the pulse transmitter further comprises a universal asynchronous receiver and transmitter (UART) that is enabled and driven by the control signal to inject an interrupt pulse corresponding to the control signal in the path when the path is in an audio mode.

3. The system of claim 2 wherein the UART further supports data communications between the communication device and the auxiliary device when the path is in a data mode.

4. A system comprising:

a pulse generator configured to provide a control signal;

a switch configured to interrupt a path between a communication device and an auxiliary device during the control signal; and a pulse transmitter responsive to the control signal and configured to inject an interrupt pulse in the path, while the path is interrupted, wherein the switch is further configured to reconnect the path after the control signal, and wherein the interrupt pulse is injected into the path to signal to the auxiliary device that the path will be switched to a data mode.

5. An integrated circuit comprising:

a pulse generator configured to provide a control pulse;

a transmission gate configured to interrupt an audio path in a cellular phone to CarKit interface during the control pulse, thereby disconnecting the audio path; and a universal asynchronous receiver and transceiver (UART) responsive to the control pulse and configured to inject an interrupt pulse in the audio path, while the audio path is interrupted, wherein the transmission gate is further configured to reconnect the audio path after the control pulse ends.

6. The integrated circuit of claim 5 wherein the pulse generator further comprises a resistor capacitor pulse circuit coupled to a Schmidt trigger detector collectively configured to provide the control pulse with a predetermined timing characteristic.

7. The integrated circuit of claim 5 wherein the UART is enabled and driven by the control pulse to inject an interrupt pulse in the audio path, the interrupt pulse having a specified duration and amplitude.

* * * * *